United States Patent
Gandy et al.

(10) Patent No.: US 6,884,959 B2
(45) Date of Patent: Apr. 26, 2005

(54) CONTROLLED COMPOSITION WELDING METHOD

(75) Inventors: David Wayne Gandy, Concord, NC (US); James William Hales, Harrison, TN (US); William Frederick Newell, Jr., Mooresville, NC (US); Roger Allen Swain, Harrisburg, NC (US); James Franklin Turner, Signal Mountain, TN (US); Ramaswamy Viswanathan, Saratoga, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 166 days.

(21) Appl. No.: 09/949,472

(22) Filed: Sep. 7, 2001

(65) Prior Publication Data

US 2003/0052110 A1 Mar. 20, 2003

(51) Int. Cl.[7] .............................. B23K 9/04; B23K 9/18; B23K 9/12
(52) U.S. Cl. .................................. 219/76.14; 219/73.21
(58) Field of Search ................................ 219/73, 73.21, 219/76.14

(56) References Cited

U.S. PATENT DOCUMENTS

| | | | |
|---|---|---|---|
| 2,681,970 A | * | 6/1954 | Koopman .................... 219/74 |
| 2,870,323 A | * | 1/1959 | Roper et al. ............ 219/137 R |
| 2,932,723 A | * | 4/1960 | Sibley et al. .................. 219/74 |
| 2,938,107 A | | 5/1960 | Pease |
| 3,185,814 A | * | 5/1965 | Rössner et al. .......... 219/76.14 |
| 3,215,809 A | * | 11/1965 | Morimoto et al. ............. 219/73 |
| 3,223,818 A | * | 12/1965 | Chyle .......................... 219/73 |
| 3,274,371 A | * | 9/1966 | Manz et al. ............ 219/137 R |
| 3,293,400 A | * | 12/1966 | Brogdon ...................... 219/73 |
| 3,420,979 A | | 1/1969 | Gowan |
| 3,546,415 A | | 12/1970 | Marantz |
| 3,549,856 A | * | 12/1970 | Saenger ................... 219/137 R |
| 3,624,345 A | | 11/1971 | Armstrong |
| 3,746,833 A | | 7/1973 | Ujiie |
| 3,936,654 A | | 2/1976 | Cannata |
| 3,936,655 A | | 2/1976 | Arnoldy |
| 3,978,907 A | | 9/1976 | Rabinovich et al. |
| 4,020,314 A | | 4/1977 | Barger |
| 4,027,135 A | | 5/1977 | Barger |
| 4,091,253 A | | 5/1978 | Bagshaw et al. |
| 4,143,257 A | | 3/1979 | Herrmann |
| 4,149,060 A | | 4/1979 | Barger |
| 4,214,141 A | | 7/1980 | Okuda et al. |
| 4,266,110 A | | 5/1981 | Barger |
| 4,307,281 A | | 12/1981 | Ivannikov et al. |
| 4,400,608 A | | 8/1983 | Wagatsuma et al. |
| 4,442,340 A | | 4/1984 | Kawabata et al. |
| 4,484,959 A | | 11/1984 | Boucher et al. |
| 4,518,625 A | | 5/1985 | Westfall |
| 4,521,664 A | | 6/1985 | Miller |
| 4,572,936 A | | 2/1986 | Scholz et al. |
| 4,584,457 A | | 4/1986 | Dilthey et al. |
| 4,780,594 A | | 10/1988 | Rothermel |

(Continued)

OTHER PUBLICATIONS

Chapter 6: Submerged Arc Welding, pp. 192–203.
Chapter 8: Electroslag Welding, pp. 272–283.

Primary Examiner—Kiley Stoner
Assistant Examiner—Kevin McHenry
(74) Attorney, Agent, or Firm—Morgan, Lewis & Bockius LLP

(57) ABSTRACT

This invention relates to a method and apparatus for controlling the composition of a weld. More particularly it relates to welding using an electric circuit, thereby creating a weld puddle, and adding at least one filler that is electrically independent from the electric circuit to the weld puddle at a controllable rate to obtain a target weld composition. The filler can be added to the extent limited by practical weld puddle geometry and, thus, the method and apparatus also facilitate increased weld deposition rates.

11 Claims, 5 Drawing Sheets

U.S. PATENT DOCUMENTS

| | | |
|---|---|---|
| 4,782,206 A | 11/1988 | Ayres et al. |
| 4,788,412 A | 11/1988 | Hori et al. |
| 4,902,873 A | 2/1990 | Ivannikov |
| 5,124,527 A | 6/1992 | Takano et al. |
| 5,140,140 A | 8/1992 | Pollack |
| 5,146,064 A | 9/1992 | Poirier |
| 5,149,939 A | 9/1992 | Imaizumi et al. |
| 5,214,265 A | 5/1993 | Pollack |
| 5,714,735 A | 2/1998 | Offer |
| 5,994,659 A | 11/1999 | Offer |
| 6,023,043 A * | 2/2000 | Manabe et al. ............. 219/123 |
| 6,040,545 A * | 3/2000 | Taki et al. .................... 219/75 |
| 6,069,334 A | 5/2000 | Capitanescu |

* cited by examiner

CONTROLLED COMPOSITION WELDING METHOD

BACKGROUND OF THE INVENTION

1. Field of the Invention

The invention relates to a method for welding. More specifically, the invention is concerned with a method for welding that provides for increased control of the weld composition and an increased weld deposition rate.

2. Description of the Related Art

Welding is often not an ideal method of manufacture or repair. Achieving weld metal deposits to satisfy composition, material properties and production requirements cannot always be accomplished with readily available or off-the-shelf welding consumables. Special melts or lots of bare wire, rod, or fluxes can be obtained, but not without any combination of impediments, such as observing minimum quantities, extended lead times, and premium prices. Due to manufacturing restrictions certain chemical composition or mechanical requirements cannot even be achieved with special consumables. Desires to increase production deposition rates are commonly thwarted by complex component geometry and the limitations of the available shop equipment and power, including the chosen welding process.

Two particular welding methods show opportunity for improvement. The submerged arc (SAW) and electroslag (ESW) welding processes have been used for several decades to deposit high quality corrosion resistant or hard-facing deposits using the strip clad technique in a variety of industries. In the power industry, SAW and ESW have seen extensive use in the cladding of reactor pressure vessels, piping, and large bowl, or coal mill rolls where corrosion or wear present problems. ESW and SAW are also used in surfacing techniques where the objective is to deposit additional material to counteract or anticipate the effects of erosion or abrasion. The difference between surfacing and cladding techniques resides more in the desired material composition and function than the method used to apply the material.

These processes and other traditional arc-welding processes suffer from limitations associated with the ability to control (or vary) deposit composition. Thus, the composition of the weld is approximately constant over the surface of the product, even though different surface material properties and, therefore, a different weld deposit composition are desired. Composition has also traditionally been restricted to commercially available wrought wire and strip alloys, and production fluxes. The manufacture of tailored consumable compositions is often expensive since the manufacturer must melt an entire heat (or load) of material to use the processing equipment efficiently. Such heats can range in size from 2000–20,000 lbs. Since a typical consumable costs approximately $8.00 per pound one can easily see that it becomes tremendously expensive to develop "tailored compositions."

SAW, ESW, and traditional arc-welding methods are also limited in their abilities to vary the quantity of the weld deposited. Arbitrary variation in the weld deposit is difficult because typical consumable electrodes present arc maintenance problems (or the ESW equivalent) related to the power supplied, feed rate, feed angles, electrode extension, and arc length. The feed angle is that angle between the consumable electrode and the welded piece. The arc length is the distance between the two. These issues combine to make variation in the feed rate a non-trivial change in the welding process.

Should two such electrodes be used to make one deposit, the arcs of such electrodes also become unstable if fed at different rates. The additional angles and gaps between the second consumable electrode and both the first consumable electrode and the welded piece must be controlled. This further limits the potential weld composition variation and makes any variation at all more difficult. The electrode material is finally limited to materials that conduct electricity in the manner necessary to establish an arc and melt at a desired rate.

The combination of two consumable electrodes also presents the further problem of "arc blow." Arc blow is an undesired phenomena in which a weld deposit splatters instead of flowing to the intended location. Arc blow can occur because flowing current creates a magnetic field. With two electrodes the magnetic field from one can repulse the other resulting in force on the flowing melted weld metal to the point it splatters and potentially extinguishes the arc.

In general, where weld deposit consumables are current carrying electrodes, any variation in the feed rate of a single electrode affects the power to the weld puddle and, thus, the overall weld process including heat input, weld puddle geometry, weld composition, and deposition rate. There is, therefore, a need in the industry for a better welding method to easily and economically vary composition, improve weld deposition rates, provide better control of heat input, and weld puddle geometry.

BRIEF SUMMARY OF THE INVENTION

This invention provides a method for welding. A first embodiment of the method comprises welding a workpiece using an electric circuit, thereby creating a weld puddle, and adding at least one filler that is electrically independent from the electric circuit to the weld puddle at a controllable rate to obtain a target weld composition. A second embodiment comprises causing electric current to flow among a primary electrode, a flux, and a workpiece to be welded, thereby creating a weld puddle, passing the electric current through the weld puddle to create resistance heating; and adding at least one filler that is electrically independent from the electric circuit to the weld puddle at a controllable rate to obtain a target weld composition. A third embodiment comprises causing an arc between a primary electrode and a workpiece to be welded, thereby creating a weld puddle, maintaining the puddle with heat created by the arc, the arc being located within the weld puddle, and adding at least one filler that is electrically independent from the electric circuit to the weld puddle at a controllable rate to obtain a target weld composition. In addition these three methods can be used to obtain an increased weld deposition rate.

The invention also provides an apparatus for controlling the composition of a weld. A first embodiment comprises means for creating a weld puddle on a workpiece, and means for introducing at least one additional filler, that is independent from the means for creating the weld puddle, into the weld puddle at a controllable rate. A second such embodiment comprises a first consumable electrode, a second electrode, a power supply; an electric circuit established by connecting the second electrode to the power supply and the workpiece, by connecting the first electrode to the power supply, and by establishing current flow between the first electrode and the workpiece, and at least one filler controller that is independent from the electric circuit and wherein the filler controller controls the rate at which at least one filler material is added.

The ability to tailor the composition of a weld provides benefits in the application of consumable alloys which are inherently difficult to fabricate. Solid welding consumables (wire or strip) are difficult to manufacture or fabricate in certain applications due to expense or technological limitations of drawing the consumable to a small diameter. The use of tailored compositions will help overcome this obstacle. Essentially, the present invention provides the ability to cast a desired consumable composition "in place." Such an ability allows a weld composition to be tailored so that the material properties, such as corrosion resistance, hardness, or strength, of the weld are more suited for the designed function of a particular location on the workpiece. Adding filler directly to the weld puddle also increases the deposition rate of the weld process without complicating the maintenance of the arc or other weld puddle-forming procedures.

BRIEF DESCRIPTION OF THE SEVERAL VIEWS OF THE DRAWINGS

FIG. 4b contains the continuation of the flowchart of FIG. 4a.

DETAILED DESCRIPTION OF THE INVENTION

Figure 1:
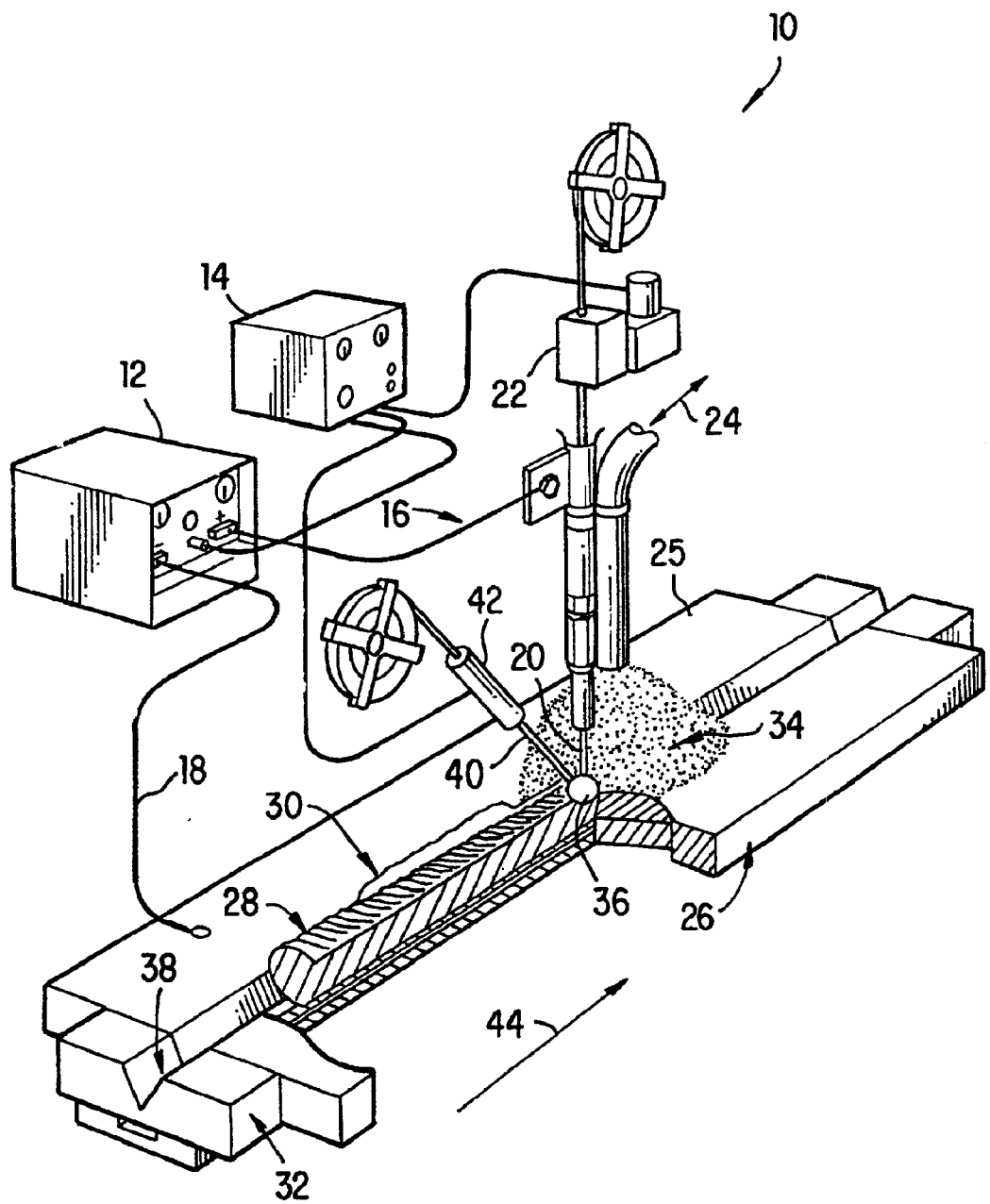
FIG. 1 illustrates a preferred embodiment of the invention-using a submerged arc welder.

The foregoing and other aspects and advantages will be better understood from the following detailed description of the preferred embodiments of the invention with reference to the drawings. Like reference numerals refer to corresponding parts throughout the drawings.

The present invention provides an improved method of welding whereby the composition of a weld, and thus the component or workpiece, can be tailored during welding to meet specific material requirements of the component at specific locations on the component. Among these requirements are the mechanical properties, such as strength and toughness, and corrosion resistance.

Referring now to FIG. 1, which illustrates a preferred embodiment of the invention using a submerged arc welder (SAW), SAW 10 is generally composed of power source 12, control panel 14, electrode lead 16, work lead 18, consumable electrode 20, machine consumable electrode feeder 22, and flux feeder 24. SAW 10 operates on workpieces 25, 26 to form weld 28 underneath solid slag 30. SAW 10 is shown joining workpieces 25, 26, but one of skill in the art will recognize that the invention, described with respect to the joining operation, could also be implemented using SAW 10 to clad or surface a workpiece, or build up a weld, such as weld 28. SAW 10 begins operation at tab 32 with the initiation of an arc (not shown) between consumable electrode 20 and workpieces 25, 26 in welding vee 38, although tab 32 is not always present, particularly on circumferential weldments. Flux 34 is then added via flux feeder 24 to the surface of workpieces 25, 26 thereby covering the arc, although, for purposes of illustration, FIG. 1 does not show flux 34 covering weld puddle 36. Welding vee 38 is formed by beveling the edges of workpieces 25, 26. Weld puddle 36 is formed in welding vee 38 by melting consumable electrode 20, flux 341, and workpieces 25, 26. After weld puddle 36 forms, filler 40 is added to weld puddle 36 with the rate of filler feeder 42 determined to give weld 38 a desired composition.

The composition of filler 40 is chosen depending primarily upon the desired final composition of weld 28. Other factors that are balanced in making the choice include: the compositions of flux 34, workpieces 25, 26, consumable electrode 20, and the rate of travel of consumable electrode 20 along welding vee 38 in direction 44. Filler 40 is added directly to weld puddle 36. Filler 40 may be added at a constant rate for the length of weld 28. Filler feeder 42 may also be controlled to vary the rate at which filler 40 is added to vary the composition of weld 28. Since filler 40 is not an electrode and is added directly to weld puddle 36, the rate it is added may vary over a wide range. This range is bounded on the low side by zero filler and on the high side by the practical shape of the weld puddle. Excessive filler could cause the weld puddle to run, or solidify too quickly due to heat transfer to filler material, among other effects known to one of skill in the art. But one desirable effect of using extra filler to cool weld puddle 36 is that the cooled weld puddle has increased surface tension and, thus, weld puddle 36 can be larger due to the extra surface tension of holding cooled weld puddle 36 together. This is particularly useful on a rounded surface, which increases the forces tending to disperse weld puddle 36. The larger weld puddle results in an increased deposition rate.

Filler 40 also need not be the only additional filler added to weld puddle 36. A second additional filler (see FIG. 3, element 43) could be added to weld puddle 36 simultaneously with filler 40, or instead of filler 40, depending upon the desired composition of weld 28. In fact, any number of additional fillers could be added to weld puddle 36 so long as the total additional filler added does not exceed the limit set by the practical weld puddle shape or thermodynamic considerations known to one of skill in the art. Similarly, the rate at which consumable electrode 20 is added may also be varied providing that weld puddle 36 retains the properties necessary to create the desired weld 28.

In general, effective energy input to workpieces 25, 26 and weld puddle 36 is a function of the consumable electrode parameters, all filler parameters, and the speed at which the weld apparatus travels over the workpiece surface. In particular, with respect to FIG. 1, as well as FIGS. 2 and 3, consumable electrode 20 is preferably introduced perpendicularly to workpieces 25, 26, or within ten degrees of perpendicular. Lesser angles of introduction increase the risk that consumable electrode 20 will lose contact with weld puddle 36, causing weld penetration to suffer. Correspondingly, filler 40 and filler 43 (FIG. 3) are preferably introduced into weld puddle 36 at angles less than 60 degrees from workpieces 25, 26. Here, greater angles increase the risk that fillers 40, 43 will stub out prior to melting.

Figure 2:
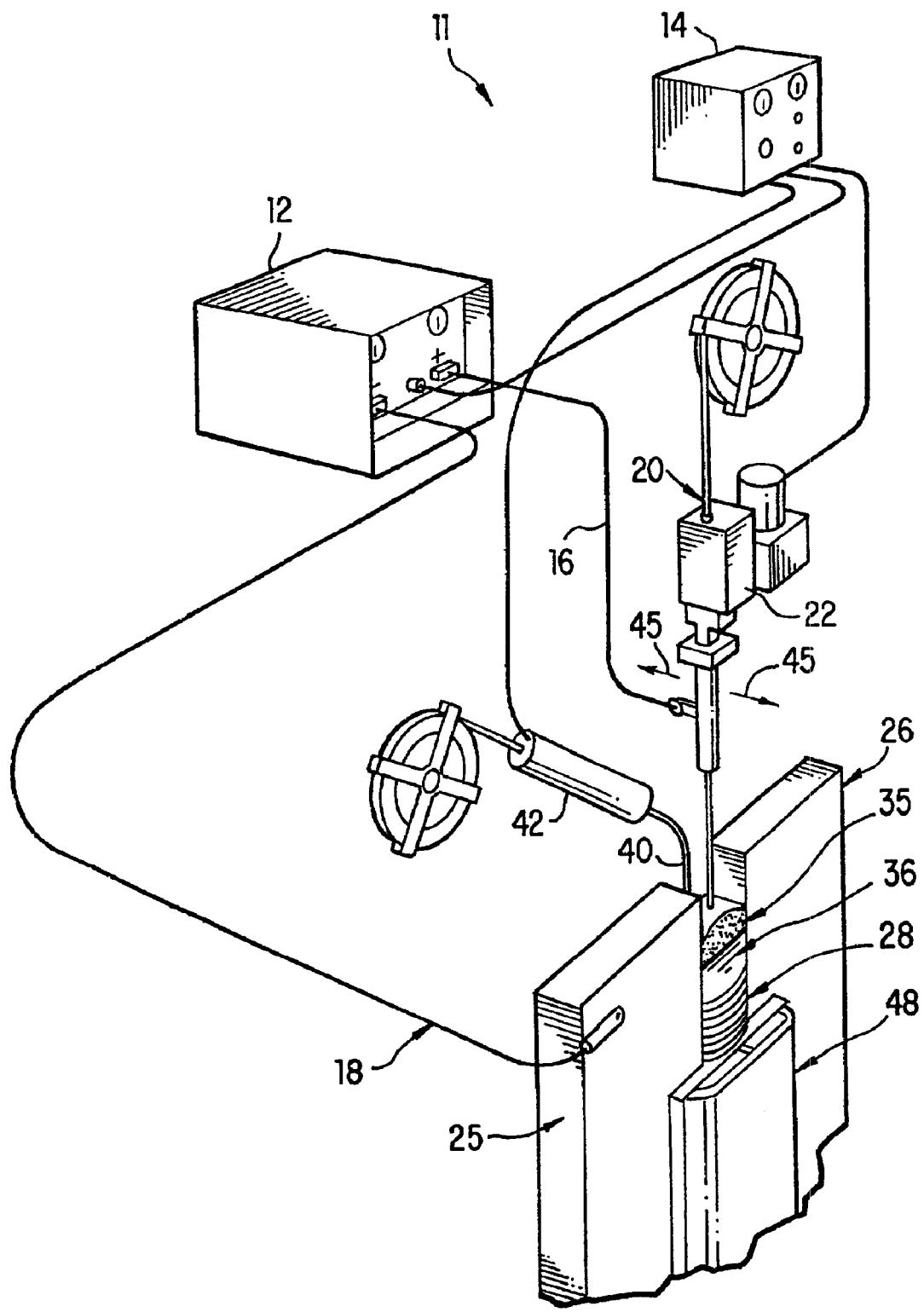
FIG. 2 illustrates a further preferred embodiment of the invention using an electroslag welder.

Referring now to FIG. 2, we see a further preferred embodiment of the invention using an electroslag welder (ESW). ESW 11 works to form weld 28 under molten slag bath 35 to join vertical workpieces 25, 26. ESW 11 is shown joining workpieces 25, 26, but one of skill in the art will recognize that the invention, described with respect to the joining operation, could also be implemented using ESW 11 to clad or surface workpiece 26, or build up a weld, such as weld 28, if the workpiece and necessary apparatus, such as retaining shoes 48 were properly oriented. ESW 11 initiates the joining of workpieces 25, 26 by initiating an arc (not shown) between consumable electrode 20 and workpieces 25, 26 at an initial location. This arc creates heat that melts consumable electrode 20 in addition to portions of workpieces 25, 26 and forms weld puddle 36. If consumable electrode 20 is flux-coed its melting provides flux to form molten slag bath 35, otherwise flux must be added to the process. With the formation of weld puddle 36 and molten slag bath 35 the arc is extinguished, and the passage of electrical current from consumable electrode 20 through the resistance of molten slag bath 35 and weld puddle 36 provides the resistance heating necessary to sustain weld puddle 36. At this point filler 40 can be added through molten slag bath 35 into weld puddle 36. As with SAW 10 of FIG. 1, filler 40 is chosen depending upon the desired composition of weld 28. As weld 28 progresses up workpieces 25, 26 retaining shoes 48, which are water cooled, are repositioned to retain molten slag bath 35 and weld puddle 36 between workpieces 25, 26, although retaining shoes 48 are not shown in total in FIG. 2 for illustrative purposes. Should it be necessary because of the thickness of workpieces 25, 26, both consumable electrode 20 and filler 40 could be horizontally oscillated by consumable electrode feeder 22 and filler feeder 42 in direction 45. Also as with SAW 10 of FIG. 1, and as illustrated in FIG. 3, additional fillers could be added to weld puddle 36 in addition to filler 40 for the purpose of varying the composition of weld 28.

Figure 3:
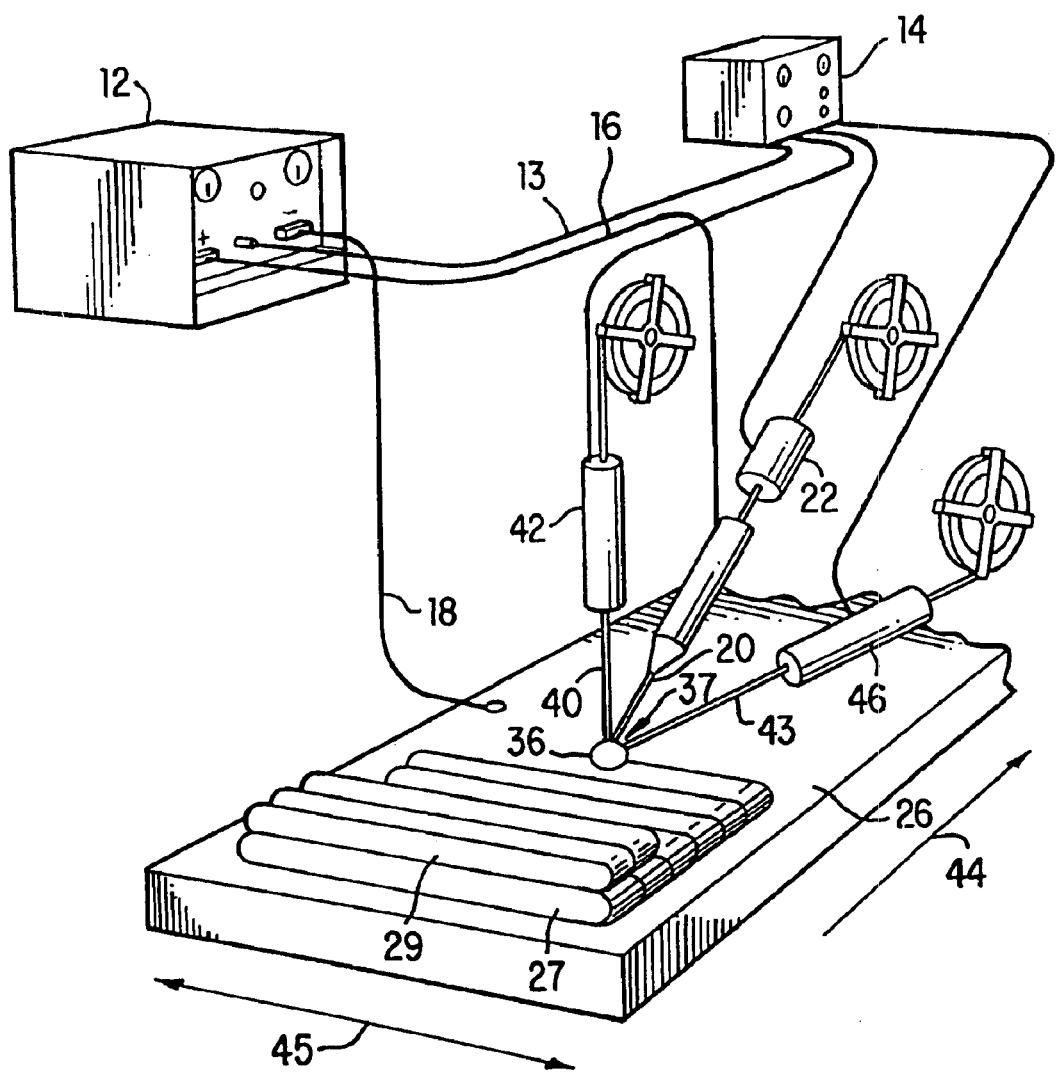
FIG. 3 illustrates an additional preferred embodiment of the invention using an arc welder.

Referring now to FIG. 3, we see illustrated an additional preferred embodiment of the present invention using a typical arc-welder 13. Here, arc-welder 13 is surfacing or cladding workpiece 26, by laying down layer 27. Layer 27 is initiated with the formation of arc 37 between consumable electrode 20 and workpiece 26. The heat from arc 37 forms weld puddle 36 by melting workpiece 26 and consumable electrode 20. Upon formation of weld puddle 36 additional fillers 40 and 43, fed by their respective filler feeders 42, 46, may be added to weld puddle 36 to form layer 27 with a desired composition. After consumable electrode 20 and additional fillers 40 and 43 are passed over workpiece 26, or arc welder 13 is moved in horizontal direction 45, workpiece 26 is moved in direction 44 for another horizontal pass.

Arc-welder 13 may only use a single additional filler, or may vary the feed rates of additional fillers 40 and 43 to form a layer of varying composition, just as ESW 11 and SAW 10 could use a single filler or multiple fillers. Such compositional variation could be needed due to the need for different locations on the workpiece to have different material properties such as, for example, corrosion resistance, strength, or hardness. A second layer 29 serves to illustrate how the composition of the weld deposited could be varied in three dimensions by varying consumable electrode 20 plus fillers 40 and 43. Where layer 27 is an inner layer and the material property needed might be toughness, or strength, additional fillers 40 and 43 would be chosen to impart those material properties. But if layer 29 is then an external layer and more corrosion resistance is required, then additional fillers 40 and 43 could be varied in their deposition rate, or composition so that layer 29 achieves the desired corrosion resistance. In this manner a workpiece could be surfaced with many layers, with the inner layers possessing the strength and toughness necessary for the loads the workpiece is to bear, and the outer layer possessing improved corrosion resistance for improved overall longevity. In fact, each layer in a multi-layered cladding could be made a different composition just by varying the fillers used.

The preferred embodiment of the invention as depicted in FIG. 3 could be used in weld buildup of turbine discs where excellent corrosion resistance is desired at the blade attachment region, yet high strength is also necessary. Most of the weld would be with a high tensile, high yield strength filler that matched the inner blade metal, with a gradual change in filler composition to a corrosion resistant filler over the last few layers. This would assure excellent weld properties. Also, both SAW 10 (FIG. 1) and ESW 11(FIG. 2, modified for a horizontal workpiece) welding apparatuses could be used to clad or surface weldpiece 26 in FIG. 3, in addition to arc welder 13.

Similarly, in applications requiring high wear resistance (such as valve seats, steel mill rolls, or other material handling/crushing equipment), the weld composition could be tailored over the final four or so layers to go from an alloy steel base metal with poor wear resistance to a hardfacing alloy at the surface with very high wear resistance by selecting the appropriate consumable electrode, fillers and rates of addition. Since many hardfacing consumables are difficult to apply due to the dissimilarity between the base metal substrate and the hardfacing material, this use of tailored compositions would minimize this difficulty by allowing the change from alloy steel to hardfacing steel to be gradual, thus minimizing the dissimilarity between any two layers.

The invention would also benefit gears. Typically, gears are carburized to develop good wear resistance at the surface while maintaining high toughness and strength throughout the remainder of the gear. The use of tailored compositions would allow the engineer to fabricate high wear resistant gears via welding, thus eliminating potential concerns over decarburization of the surface wear region.

Figure 4A:
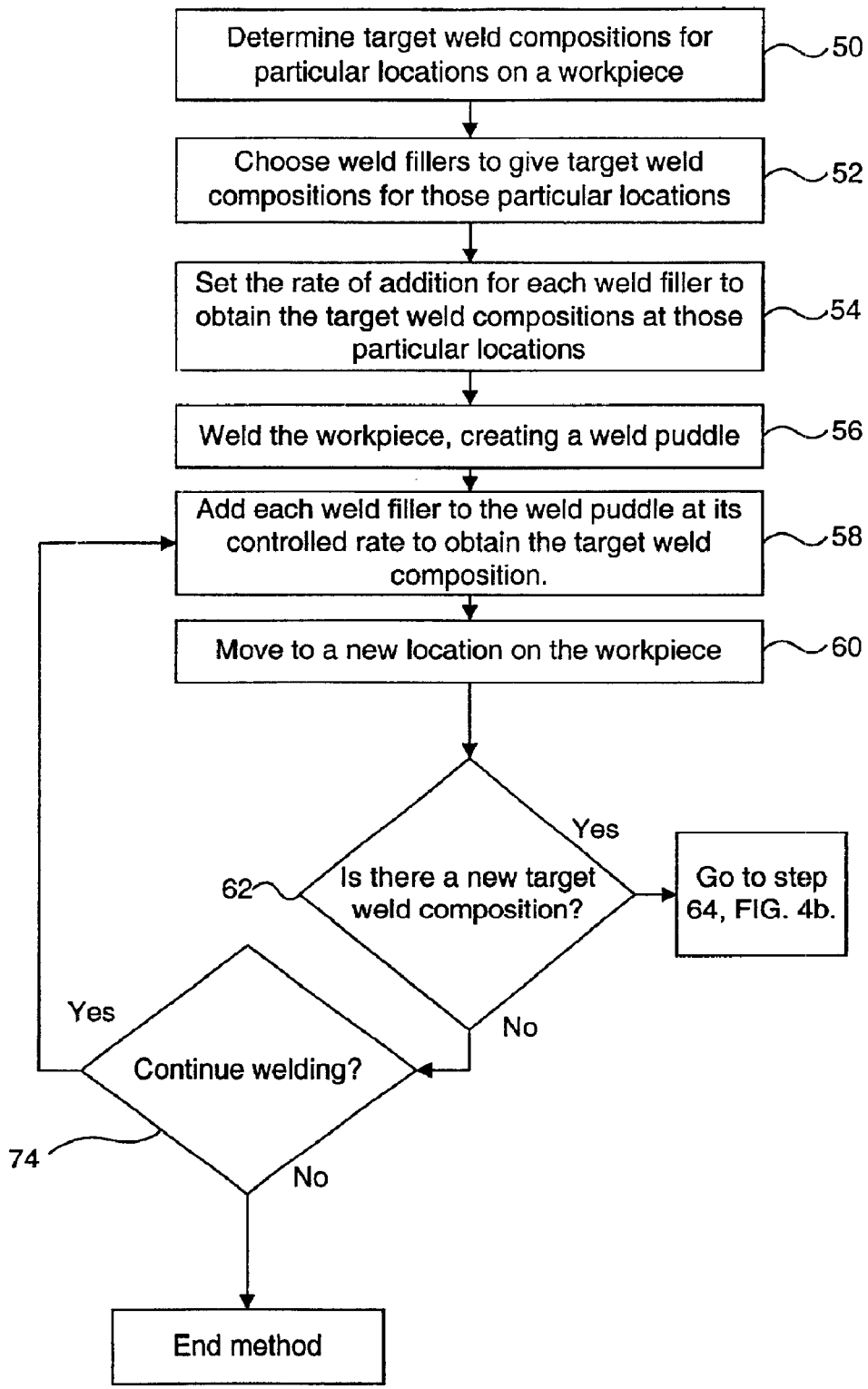
FIG. 4a contains a flowchart of a preferred embodiment of the method of the invention.
Figure 4B:
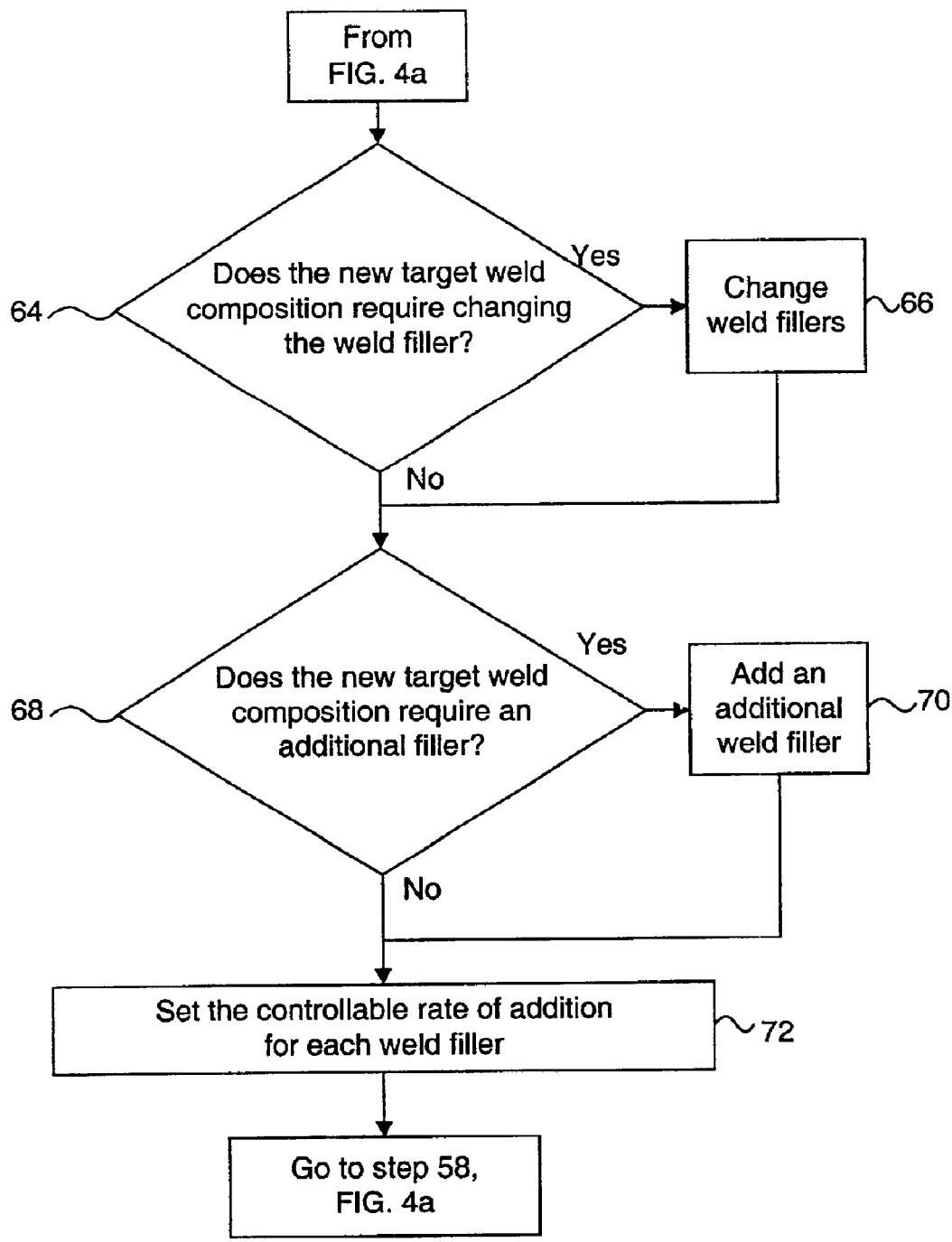

Now referring to FIGS. 4a and 4b, we describe a flowchart of a preferred embodiment of the method of the invention. Step 50 is to determine the target weld compositions for specific locations on a workpiece or component. As discussed with respect to FIGS. 1, 2, and 3, the target compositions can vary according to location on the workpiece, depending upon the material properties desired for that location, and in three dimensions. Step 52 is to choose the filler or fillers necessary for the weld to achieve the target compositions of step 50. One of skill in the art will know to select fillers from those commercially available or fabricated fillers that contain the elements and materials needed to achieve the target composition, if the selected fillers are added in the appropriate amounts. Thus, the desired total weld deposition rate must also be considered in this step. Step 54 is to set the rate of addition for each filler for specific locations so that the combined fillers and weld puddle leave a weld of the desired target compositions at those locations, again also considering the desired total weld deposition rate. Step 56 is to weld the workpiece to create a weld puddle. As illustrated in FIGS. 1, 2 and 3, there are many ways to create a weld puddle that are suitable. One of skill in the art will recognize that many ways exist for creating the heat necessary to form a weld puddle and practice the current invention, in addition to those illustrated in the preceding Figures. Step 58 is then to add the necessary fillers to the weld puddle at the rates determined to yield the target weld composition. Step 60 is to move to a new location on the object after the weld of step 58 is completed. That "new" location could in actuality be the same location if more weld deposit is desired at that spot or if a different weld composition is desired over the previous weld. It should be noted that the present method is described in discrete steps, reflecting discrete movements for simplicity, but in actual practice the movement from weld location to weld location would be continuous, and the weld fillers used and the rates at which they would be added would also be adjusted continuously, or as necessary. In this way, step 56 need only be performed at the beginning of the weld, since the proper continuation of the weld process works to perpetuate the weld puddle. Step 62 is to determine whether, at the new location of step 60, a new weld composition is desired. If so, then the method is to proceed to step 64 of FIG. 4b. If not, then steps 58 through 60 are simply repeated until the entire weld is complete (and the answer to step 74 is to discontinue welding).

If a new target weld composition is desired, then step 64, now referring to FIG. 4b, is to determine whether the new target requires a change of fillers, and step 66 is to change the filler if necessary. The actual change of filler could be accomplished by numerous means, such as stopping one filler feeder and starting another, in addition to simply reloading a filler feeder with a different filler. Step 68 is to determine whether the new target composition requires any additional fillers. Should that be necessary, step 70 is to introduce the necessary fillers. It should be apparent to one of skill in the art that the choice of fillers is so dependent upon many factors including cost and availability that one desired weld composition could be achieved using any number of fillers and feed rates, depending upon the fillers chosen.

Step 72 is then to set the rate of addition of each chosen filler so that when added to the weld puddle, the combined fillers and weld puddle leave a weld of the desired composition. After step 72 the method returns to step 58 and follows the method until step 74 directs you to end welding.

The above Figures have described areas where compositional control of weld 28 is important. A second and similarly important aspect of the invention is the ability to increase the deposition rate over that of currently used processes due to the increased ability to add multiple fillers at varied rates independently from the creation and sustaining of weld puddle 36. Excess (or unused) energy is normally associated with the processes depicted in FIGS. 1, 2, and 3 and this is normally dispersed into previous weld layers or the base metal substrate. The introduction of a secondary filler makes use of this excess energy and thereby increases the total weld deposit.

Two applications where the technology would be useful include the weld buildup of turbine rotors or discs and heavy equipment welding, such as earthmoving equipment. Weld buildup on rotors or discs would enable utilities to dramatically decrease the amount of time it takes to repair a turbine via welding. Weld buildup on heavy equipment, in addition to decreasing repair time, would benefit from the invention's ability to achieve weld buildups with wear resistant compositions to increase the longevity of equipment such as bulldozer blades, blades on pans, dredging equipment, or drag lines.

With the welding method described herein a desired composition can be developed through welding. Significant savings can be realized, as some specialized solid welding wires can run over $100 per lb, since the purchase of small or large batches of such special materials are unnecessary where the method of the present invention allows the creation of the same composition through multiple fillers. Furthermore, multiple weld compositions can be generated and optimized for the desired component service conditions.

Finally, this invention can be utilized for the manufacture, fabrication, repair or modification of: steam or industrial turbine rotor/disc components, bowl mills and rolls, waterwall cladding and tubes, fan components, nuclear waste/transportation casks, vessel and pipe interior and exterior cladding. Further uses include: blowout preventers, valves, steel mill components, concast rolls and ladle refurbishment, rail build-up and repair, heavy equipment related to mining and material handling such as crushers and conveyors, marine propeller shafts and sea chests. Additional other uses are: centrifugal casting molds, die repair, plate overlay in lieu of explosion or other bonding methods. Any commercial application which involves manufacture, fabrication, or repair of heavy industrial components will benefit from this technology due to its ability to control composition, metallurgical structure, shrinkage, distortion, and residual stress.

EXAMPLE 1

The following example describes the creation of a tailored weld composition in an exemplary embodiment according to the present invention. This example shows the method of the invention used to change the composition of a weld, with the weld created using a submerged arc welding technique and apparatus such as that illustrated in FIG. 1. Also, this example uses multiple filler wires, as depicted in FIG. 3, fillers 40 and 44, to change both weld composition and weld deposition rate. For the purposes of this example, only the Cr and Ni content and their changes will be discussed. It is important to note that the second filler (wire) used is considerably higher in Cr and lower in Ni than the 150003-1 strip filler. (See Table 1 for filler compositions.)

Now referring Table 2, we see that for a weld made with the strip filler 150003-1, and no secondary filler (Test Bead # P2B14), the Cr and Ni content are 0.28 and 2.45 wt. % respectively. (See Table 3.) If a single wire is added (Test Bead # P2B15) the composition changes to 1.25 wt. % Cr and 2.20 wt. % Ni. Adding a second wire (Test Bead # P3B3) provides a new composition of 2.18 wt. % Cr and 2.01 wt % Ni. All welding parameters were held constant for the three welds with the exception of the secondary wire addition.

The weld composition changes radically from one test to the next. The beginning Cr content changed from 0.28 to 2.18 wt. %. Additionally, the Ni content was lowered from 2.45 to 2.01 wt %. The method created new weld compositions depending upon the amount of wire added and realized a greater amount of wire deposited. This particular example altered the number of wires and wire feed rate, but a similar result could be had by changing only the wire feed rate.

TABLE 1

Chemical composition of the strip filler material 15003-1 and the 1.6 mm diameter metal core wire filler material, M91.

|  | C | Mn | Si | Cr | Ni | Mo |
|---|---|---|---|---|---|---|
| Strip 150003-1 | 0.12 | 1.7 | 0.15 | 0.33 | 2.6 | 0.6 |
| Wire | 0.08 | 0.96 | 0.32 | 8 | 0.26 | 0.96 |

TABLE 2

Four layer test deposits demonstrating the ability to increase the weld deposition rate by adding additional filler. Note the increase in deposition rate (lbs/hr) by introducing one, then two secondary filler materials.

| Test | Strip Filler | Flux | # Layers | Strip Feed, ipm | Additional wire feed, | Deposition Rate, lbs/hr. |
|---|---|---|---|---|---|---|
| P2B14 | 150003-1 | SA120 | 4 | 72 | None | 26.39 |
| P2B15 | 150003-1 | SA120 | 4 | 72 | 1@66 ipm | 29.30 |

TABLE 2-continued

Four layer test deposits demonstrating the ability to increase the weld deposition rate by adding additional filler. Note the increase in deposition rate (lbs/hr) by introducing one, then two secondary filler materials.

| Test | Strip Filler | Flux | # Layers | Strip Feed, ipm | Additional wire feed, | Deposition Rate, lbs/hr. |
|---|---|---|---|---|---|---|
| P3B3 | 150003-1 | SA120 | 4 | 72 | 2@66 ipm | 32.20 |
| P3B5 | 150003-1 | SA120 | 4 | 85 | 2@100 ipm | 39.97 |
| P3B10 | 150003-1 | SA120 | 4 | 85 | 2@125 ipm | 42.17 |

TABLE 3

Resulting weld chemistries of four layer test deposits described in Table 2. Note the ability to alter composition of the chromium and nickel levels by the introduction of a secondary wire(s).

| Test Bead Number | C | Mn | Si | Cr | Ni | Mo |
|---|---|---|---|---|---|---|
| P2B14 | 0.086 | 1.49 | 0.51 | 0.28 | 2.45 | 0.58 |
| P2B15 | 0.086 | 1.46 | 0.51 | 1.25 | 2.20 | 0.65 |
| P3B3 | 0.094 | 1.35 | 0.44 | 2.18 | 2.01 | 0.71 |
| P3B5 | 0.092 | 1.40 | 0.47 | 2.19 | 2.00 | 0.70 |
| P3B10 | 0.089 | 1.34 | 0.44 | 2.57 | 1.91 | 0.72 |

It is to be understood that while illustrative embodiments of the invention have been shown and described herein, various changes and adaptions in accordance with the teachings of the invention will be apparent to those of skill in the art. Such changes and adaptions nevertheless are included within the spirit and scope of the invention as defined in the following claims.

We claim:

1. A method for welding, comprising:
   welding a workpiece using an electric circuit and a consumable electrode, thereby creating an electrical arc and a weld puddle;
   providing a flux material to cover said electrical arc;
   adding at least one non-electrically connected filler to said weld puddle at a controllable rate to obtain a target weld composition for a weld; and
   varying said controllable rate during said welding to obtain a second target weld composition within said weld.

2. A method for welding, comprising:
   welding a workpiece using an electric circuit and a consumable electrode, thereby creating an electrical arc and a weld puddle;
   providing a flux material to cover said electrical arc;
   adding at least one non-electrically connected filler to said weld puddle at a first controllable rate to obtain a target weld composition for a weld; and
   adding a second non-electrically connected filler to said weld puddle, wherein said second non-electrically connected filler is added at a second controllable rate.

3. The method of claim 2, further comprising varying said second controllable rate during said welding to obtain a second target weld composition within said weld.

4. The method of claim 2, further comprising varying said first controllable rate and said second controllable rate during said welding to obtain a second target weld composition within said weld.

5. A method for welding, comprising:
   welding a workpiece using an electric circuit and a consumable electrode, thereby creating an electrical arc and a weld puddle, thereby creating a weld region;
   providing a flux material to cover said electrical arc; and
   adding at least one non-electrically connected filler to said weld puddle at a first location within said weld region at a first controllable rate to obtain a target weld composition; and adding at least one additional non-electrically connected filler material at a second location within said weld region at a second controllable rate to obtain a second target weld composition.

6. The method of claim 5, further comprising varying said second controllable rate during said welding.

7. A method for welding comprising:
   welding a workpiece using an electric circuit and a consumable electrode, thereby creating an electrical arc and a weld puddle;
   adding said consumable electrode at a primary controllable rate;
   providing a flux material to cover said electrical arc;
   adding at least one non-electrically connected filler to said weld puddle at a controllable rate to obtain a target weld composition for a weld; and
   varying said primary controllable rate during said welding.

8. A method for controlling the composition of a weld, comprising:
   causing an arc between a primary electrode and a workpiece to be welded, thereby creating a weld puddle;
   maintaining said weld puddle with heat created by said arc;
   providing a flux material to cover said arc;
   adding at least one non-electrically connected filler to said weld puddle at a controllable rate to obtain a target weld composition; and
   varying said controllable rate during said adding.

9. A method for controlling the composition of a weld, comprising:
   causing an arc between a primary electrode and a workpiece to be welded, thereby creating a weld puddle;
   maintaining said weld puddle with heat created by said arc;
   providing a flux material to cover said arc;
   adding at least one non-electrically connected filler to said weld puddle at a first controllable rate to obtain a target weld composition; and
   adding a second non-electrically connected filler to said weld puddle, wherein said second non-electrically connected filler is added at a second controllable rate.

10. The method of claim 9, further comprising varying said second controllable rate during said adding to obtain a second target weld composition within said weld.

11. A method for controlling the composition of a weld, comprising:
    causing an arc between a primary electrode and a workpiece to be welded, thereby creating a weld puddle;
    maintaining said weld puddle with heat created by said arc;
    adding said primary electrode at a primary controllable rate;
    providing a flux material to cover said arc; and
    adding at least one non-electrically connected filler to said weld puddle at a controllable rate to obtain a target weld composition; and
    varying said primary controllable rate during said causing.

* * * * *